(12) United States Patent
Mills

(10) Patent No.: US 10,881,082 B2
(45) Date of Patent: Jan. 5, 2021

(54) ANIMAL BACK SUPPORT APPARATUS

(71) Applicant: Renee Mills, Mount Airy, MD (US)

(72) Inventor: Renee Mills, Mount Airy, MD (US)

( * ) Notice: Subject to any disclaimer, the term of this patent is extended or adjusted under 35 U.S.C. 154(b) by 296 days.

(21) Appl. No.: 15/992,468

(22) Filed: May 30, 2018

(65) Prior Publication Data
US 2019/0364847 A1 Dec. 5, 2019

(51) Int. Cl.
A01K 13/00 (2006.01)
A01K 27/00 (2006.01)

(52) U.S. Cl.
CPC .......... A01K 13/006 (2013.01); A01K 27/002 (2013.01)

(58) Field of Classification Search
CPC .... A01K 13/006; A01K 27/002; A01K 13/00; A61D 9/00
See application file for complete search history.

(56) References Cited

U.S. PATENT DOCUMENTS

| | | | | |
|---|---|---|---|---|
| 5,887,772 A * | 3/1999 | Dooley | ................ | A01K 1/0263 119/858 |
| 6,123,049 A | 9/2000 | Slater | | |
| 6,138,611 A * | 10/2000 | Thielemann | .......... | A01K 13/006 119/850 |
| 6,267,083 B1 * | 7/2001 | Chimienti | ............ | A01K 13/006 119/850 |
| 8,617,091 B2 | 12/2013 | Brannon et al. | | |
| 2003/0168021 A1 * | 9/2003 | Clark | ........................ | A61D 9/00 119/850 |
| 2003/0177984 A1 | 9/2003 | Newman | | |
| 2006/0156997 A1 | 7/2006 | Moore | | |
| 2008/0110414 A1 * | 5/2008 | Buehner | .............. | A01K 13/006 119/712 |
| 2010/0043725 A1 * | 2/2010 | Hall | ...................... | A01K 13/006 119/850 |
| 2010/0199507 A1 | 8/2010 | Gonzalez | | |
| 2010/0240272 A1 * | 9/2010 | Cosson | .................... | B63C 9/115 441/106 |
| 2012/0024239 A1 * | 2/2012 | Forbes | .................. | A01K 27/002 119/850 |
| 2012/0316484 A1 | 12/2012 | Brannon | | |
| 2015/0020752 A1 * | 1/2015 | Zimmerman | ........ | A01K 1/0263 119/792 |
| 2016/0015003 A1 * | 1/2016 | Watson | ................. | A01K 27/002 224/600 |
| 2018/0303068 A1 * | 10/2018 | Chen | ..................... | A01K 27/009 |
| 2019/0124890 A1 * | 5/2019 | Kath | ..................... | A01K 27/002 |
| 2019/0307541 A1 * | 10/2019 | Luckenbach | ............. | A61F 5/02 |

* cited by examiner

Primary Examiner — Magdalena Topolski
Assistant Examiner — William L Gmoser
(74) Attorney, Agent, or Firm — Patent Negotiator, PLLC; Sarita L. Pickett, Esq.; Robert Deleault

(57) ABSTRACT

An animal back support apparatus includes a main back support, a chest harness and an optional lumbar support component. The main back support features relatively rigid stays placed over the spine and one on each side of the spine and foam inlays to conform to the pets back between the pets back and the rigid stays. The animal back support apparatus also includes a first side panel on one side of the main back support and a second side panel on an opposite side of the main back support where the first and second side panels extend towards the abdomen of the animal and interact with each other to encircle the torso of the animal. The chest harness attaches to the main support layer.

14 Claims, 9 Drawing Sheets

ANIMAL BACK SUPPORT APPARATUS

BACKGROUND OF THE INVENTION

1. Field of the Invention

The present invention relates generally to spinal support devices. Particularly, the present invention relates to back braces for animals.

2. Description of the Prior Art

Orthotic devices are often used to support patients suffering from skeletal injuries. These devices stabilize an affected bone structure to prevent further injury. Some orthotic devices are braces designed to wrap around the affected portion of the body, such as a spine brace designed to wrap around a torso to stabilize a back.

Animals may suffer from skeletal injuries. Conventionally, veterinarians order crate rest and substantially restrict activity to allow injuries to heal. Some orthotic devices are available for animals to support the animal during recovery and help to prevent the worsening of such conditions.

One approach of an animal spine brace is disclosed by U.S. Pat. No. 8,617,091 to Brannon. The brace has an upper panel and a lower panel that extends from the upper panel. The lower panel is releasably secured to the upper panel and forms a sleeve around an animal. The panels may be made of a breathable material which may be configured to stretch as well as wick away moisture and control odor. Both upper and lower panels include supportive stays.

SUMMARY OF THE INVENTION

Support devices such as braces can be used to assist in recovery and prevent further injury. For example, a knee brace may be used to support a knee by accepting pressure a thigh places on a calf while walking, thereby relieving the knee of pressure and preventing aggravation of the injury. Support devices may be molded into different shapes to particularly fit the injury and the animal.

Animal skeletal stabilization poses unique challenges such as difficulty of putting on the animal, providing proper animal comfort, and allowing the animal to continue with normal activities. Previous methods can be further improved by providing thoracic spine support, supporting the lumbar spine, and improving fit and comfort of a back brace.

It is an object of the invention to provide thoracic spine support for an animal.

It is another object of the invention to provide optional lumbar spine support for the animal.

It is still another object of the invention to limit flexion of the spine of an animal while allowing the animal to complete all normal activities.

The present invention achieves these and other objectives by providing an animal back support apparatus that features a main back support, a chest harness and an optional lumbar support component. The main back support incorporates a two-tier support layer system that optimizes stabilization needed for the spine and the surrounding muscles to support the spine. The main back support features foam inlays to conform to the animal's back along with relatively rigid stays placed over the spine and one on each side of the spine for additional support and stabilization. Using breathable materials, rigid support stays and foam inlays provides a back support device like no other. It is designed for extended wear and moves with the four-legged animal. The rigid support stays limit flexion of the spine but allow the four-legged animal to run, sit, lay down, and complete all normal daily activities. The present invention is designed to move with the four-legged animal and offer support at the same time. The main back support will support approximately sixty-three percent (63%) of the spine. It will support the thoracic spine from T1-T13 vertebrae and include optional support to a portion of the lumbar spine (i.e. the lower back). The adjustment straps that connect the main back support, chest harness and optional lumbar support component are easily adjustable to obtain a snug fit.

In one embodiment of the present invention, the animal back support apparatus includes a main back support, a breathable first side panel, a breathable second side panel, and a chest harness. The chest harness connects to the main back support by way of releasable connectors. The main back support has a shoulder end, a hip end, a first back support side, a second back support side, and a plurality of a first mating portion of a releasable connector. The main back support is comprised of at least a first back support layer and an inlay back support layer. The first back support layer has a plurality of rigid support stays disposed thereon and adapted to extend along a spine of a four-legged animal and along both sides of the spine. The inlay back support layer has a plurality of elongated inlay pads disposed thereon and adapted to extend along the spine of the four-legged animal and along both sides of the spine between the back of the four-legged animal and the first back support layer. The inlay back support layer is fixedly attached to the first back support layer. The first and second side panels wrap towards each other under the abdomen of the four-legged animal. The chest harness includes adjustable straps with releasable connector portions that connect to mating fasteners disposed on the first back support layer to provide a snug fit of the animal back support apparatus to the four-legged animal. In one embodiment, one of each of a pair of the mating fasteners are disposed on a corresponding shoulder pad portion of the first back support layer. One of each of a second pair of mating fasteners are disposed on the first back support layer and located about midway between the shoulder end and the hip end of the main back support. The term "disposed thereon" with regard to the stays and/or the inlay elongated pads means and includes that the stays and/or elongated pads may be adhered using adhesive, or disposed within formed pockets of the respective layers, or positioned through a plurality of belt loops formed on the respective layers, and the like.

In another embodiment, the animal back support apparatus includes a pair of spaced apart first mating portions of the releasable connector attached to the first back support layer positioned adjacent to but spaced from the hip end.

In one embodiment, the animal back support apparatus includes a lumbar support component that has a lumbar body with at least one lumbar strap where the at least one lumbar strap has one of the second mating portion of the releasable connector attached adjacent to each of a first lumbar strap end and a second lumbar strap end. Each of the second mating portion of the releasable connection is configured to mate with a corresponding one of the first mating portion of the releasable connector attached to the hip end of the first back support layer where the lumbar support component is configured for positioning against a lower abdomen of the four-legged animal. The at least one lumbar strap may be attached to the outside surface of the lumbar body. In one embodiment, the lumbar support component has a sleeve made of a flexible material such as, for example, neoprene and a lumbar foam insert within the sleeve. The at least on lumbar strap may be attached to the sleeve or the sleeve may have a pair of openings where the lumbar strap enters one opening and exits the other opening without having to fixedly attached to the sleeve, or there are two lumbar straps where each strap is attached to the sleeve. The lumbar strap may be attached by sewing, adhesive, fastener, and the like.

In one embodiment, the main support layer includes a bottom back support layer fixedly attached to the first back support layer wherein the inlay back support layer is between the first back support layer and the bottom back support layer.

In another embodiment, the chest harness includes at least one protective sleeve disposed around at least one of the harness straps.

In a further embodiment, the elongated inlay pads have a thickness of about 0.5 inches.

In one embodiment, the elongated inlay pads have a length in a range from 5.7 inches to 15.3 inches.

In one embodiment, the elongated inlay pads have a width of about 1 inch.

In one embodiment, the animal back support apparatus further includes a shoulder inlay component having a shoulder inlay body. The shoulder inlay body has a first shoulder portion and a second shoulder portion where each of the first shoulder portion and the second shoulder portion extends forward toward and adjacent to the shoulder end of the main back support and where each of the first shoulder portion and the second shoulder portion are spaced from each other and located to align with a corresponding shoulder area of the four-legged animal but not visible when the main back support is positioned on the animal's back.

In one embodiment, the shoulder inlay component further includes a center shoulder body portion that connects the first shoulder portion to the second shoulder portion.

A method for stabilizing a spine of a four-legged animal is also disclosed. In this embodiment the main back support of the present invention is placed onto a back of the four-legged animal where the shoulder end is positioned near a base of a neck of the four-legged animal and the plurality of rigid support stays are positioned to extend along a spine of the four-legged animal and along both sides of the spine. The breathable first side panel of the main back support is wrapped under an abdomen of the four-legged animal and the breathable second side panel of the main back support is wrapped under the abdomen of the four-legged animal and attached to the breathable first side panel such that the main back support is snug around the four-legged animal. The chest harness is positioned against the chest of the four-legged animal where the first pair of harness straps extends across the shoulders of the four-legged animal and where the second mating portion of the releasable connector on the first pair of harness straps are connected to the corresponding first mating portion of the releasable connector located on the shoulder pad portion of the first back support layer, and where the second pair of harness straps extend from behind the front legs of the four-legged animal where the second mating portion of the releasable connector on the second pair of harness straps are connected to the corresponding first mating portion of the releasable connector located about midway between the shoulder end and the hip end of the main back support. The first pair of harness straps and the second pair of harness straps are adjusted to make the chest harness fit snugly against the chest of the four-legged animal.

In another embodiment, the method includes providing a lumbar support component having a lumbar body with at least one lumbar strap wherein the at least one lumbar strap has one of the second mating portion of the releasable connector attached adjacent to each of a first lumbar strap end and a second lumbar strap end, positioning the lumbar support component against the lower abdomen of the four-legged animal, connecting each of the second mating portion of the releasable connector to a corresponding one of the first mating portion of the releasable connector attached to the hip end of the first back support layer, and adjusting the first lumbar strap end and the second lumbar strap end to thereby provide a snug fit of the lumbar support component against the lower abdomen of the four-legged animal.

DETAILED DESCRIPTION OF THE PRESENT INVENTION

The preferred embodiments of the present invention are illustrated in FIGS. 1-14.

Figure 1:
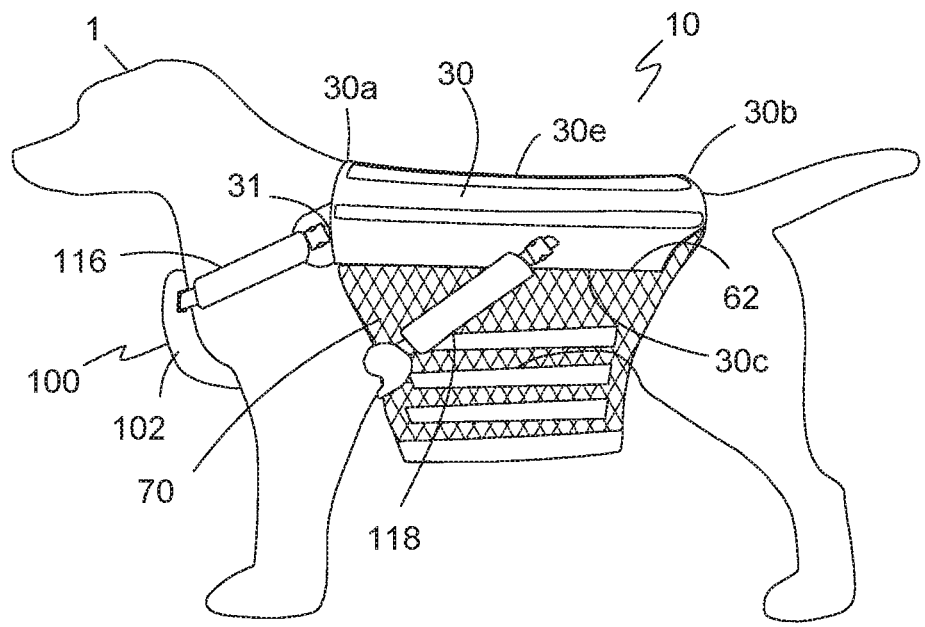
FIG. 1 is a left side view of one embodiment of the present invention showing an animal back support apparatus on an outline of a four-legged animal.
Figure 2:
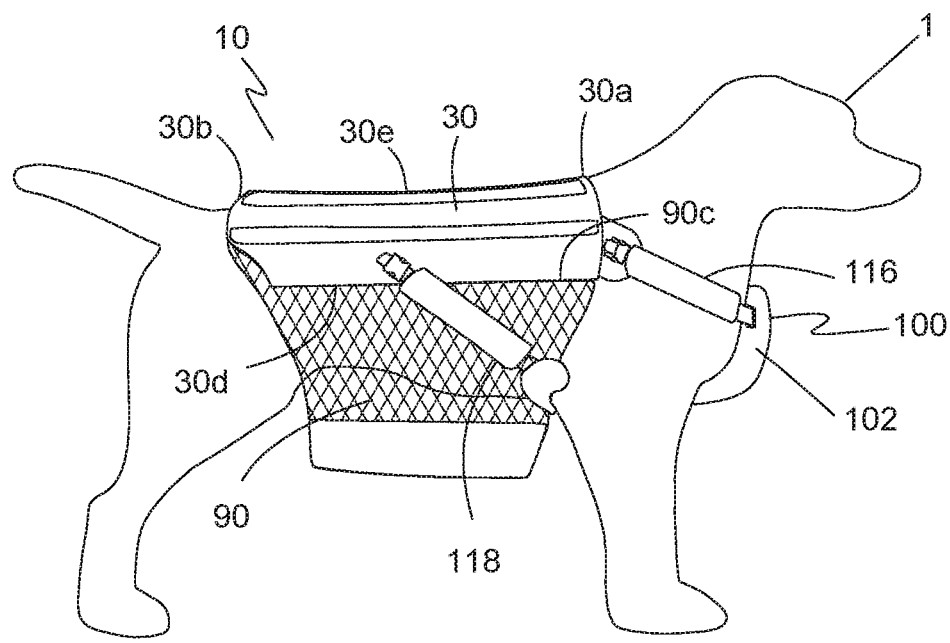
FIG. 2 is a right side view of the animal back support apparatus shown in FIG. 1.
Figure 3:
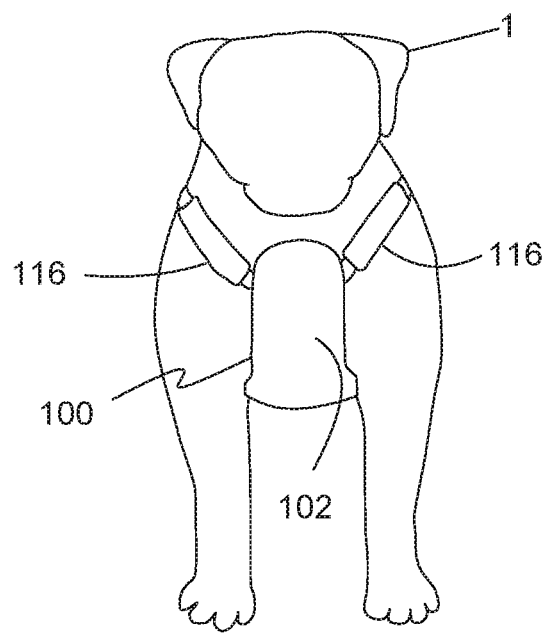
FIG. 3 is a front view of the animal back support apparatus shown in FIG. 1.

FIGS. 1, 2 and 3 show a left side view, a right side view and a front view of an animal back support apparatus 10 mounted on a four-legged animal 1. Animal back support apparatus 10 has a main back support 30, a first side panel 70, a second side panel 90, and a chest harness 100. Main back support 30 has a shoulder end 30a, a hip end 30b, a first back support side 30c, a second back support side 30d, and a mid-body support portion 30e. Main back support 30 is also made up of a first back support layer 40 (shown in FIG. 5), an inlay back support layer 45 (shown in FIGS. 6A and 6B), an optional bottom back support layer 50 (shown in FIG. 8) and an optional shoulder inlay component 58 (shown in FIG. 9), which layers and component will be more fully described later. First side panel 70 is optionally made of a breathable material such as, for example, a mesh material. Second side panel 90 is also optionally made of a breathable material such as, for example, a mesh material. First side panel 70 has a first panel base 62 directly connected to main back support 30 at a first back support side 30c. Second side panel 90 has a second panel base 92 directly connected to main back support 30 at a second back support side 30d. Chess harness 100 attaches to main back support 30 in at least two locations on each side of the four-legged animal where a first harness strap 116 is positioned over a shoulder of the animal from the animal's chest and a second harness strap 118 is positioned to extend from the animal's chest behind the front leg of the animal.

Harness strap 116 connects chest harness 100 to main back support 30 adjacent shoulder end 30a of main back support 30. Harness strap 118 connects chest harness 100 at mid-body support portion 30e of main back support 30. Releasable connectors 31 connect harness straps 116 and 118 to main back support 30 and chest harness 100. Releasable connector 31 may be any non-destructively releasable connector such as a belt clip, hook, ladder lock, clasp, or similar. Each releasable connector 31 has a first mating portion 31a (shown in FIG. 3) and a second mating portion 31b (shown in FIG. 7) which mate for a non-destructive releasable connection.

Chest harness 100 has a harness body 102. As seen in FIG. 3, harness straps 116 extend over opposed shoulder portions of the four-legged animal and attaches adjacent to shoulder end 30a (shown in FIGS. 1-2).

It is contemplated that first side panel 70 may be bent or curled to allow second side panel 90 to engage with first side panel 70. Wrapping first side panel 70 around an animal torso, permits second side panel 90 to engage with first side panel 70 by way of a fastener and thus connect second side panel 90 to first side panel 70.

Figure 4:
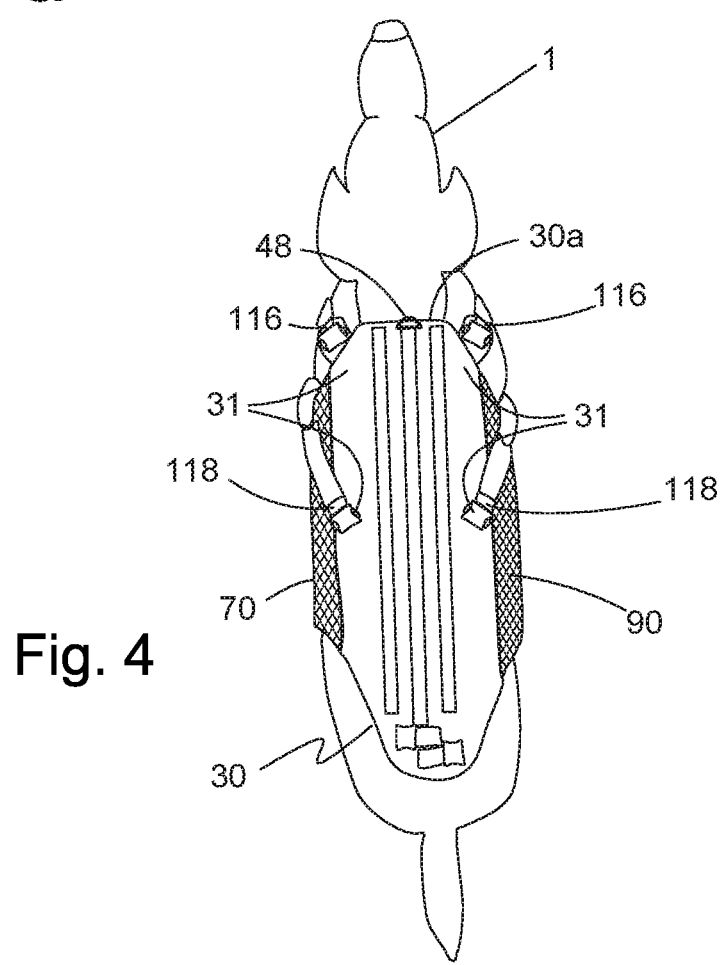
FIG. 4 is a top view of the animal back support apparatus shown in FIG. 1.

FIG. 4 shows a top view of animal back support apparatus 10 showing a connector portion 48. Connector portion 48 is proximate shoulder end 30a of main back support 30. In this embodiment, connector portion 48 is a D-ring. Connector portion 48 may be any connection mechanism which offers an opportunity to attach a leash, tether, carabiner, or clip to connect such as a hook, bracket, clamp, O-ring, and the like. Also illustrated are three support stay covers 42.

Figure 5:
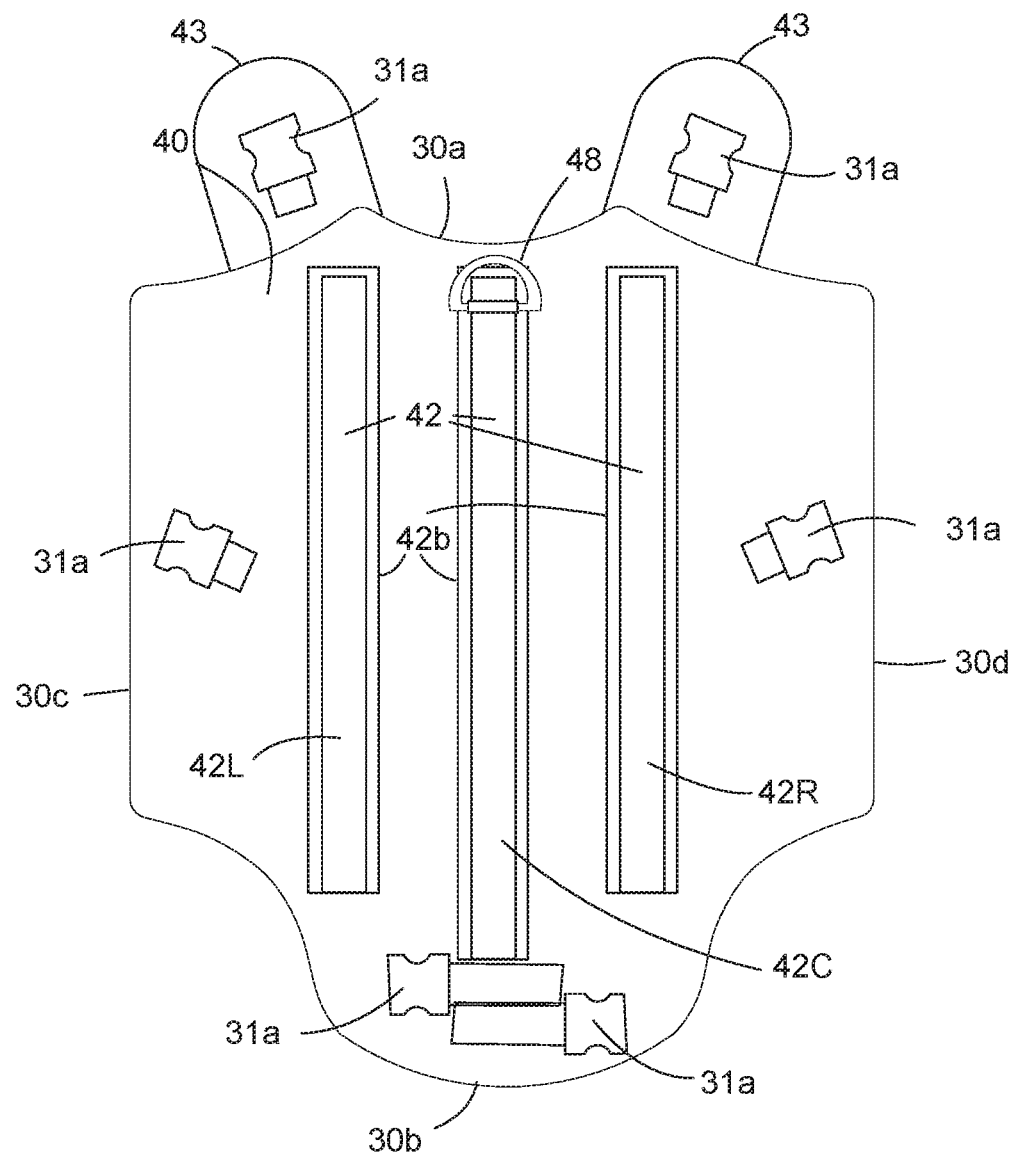
FIG. 5 is a top view of the main back support of the animal back support apparatus of FIG. 1 showing the first back support layer.
Figure 6A:
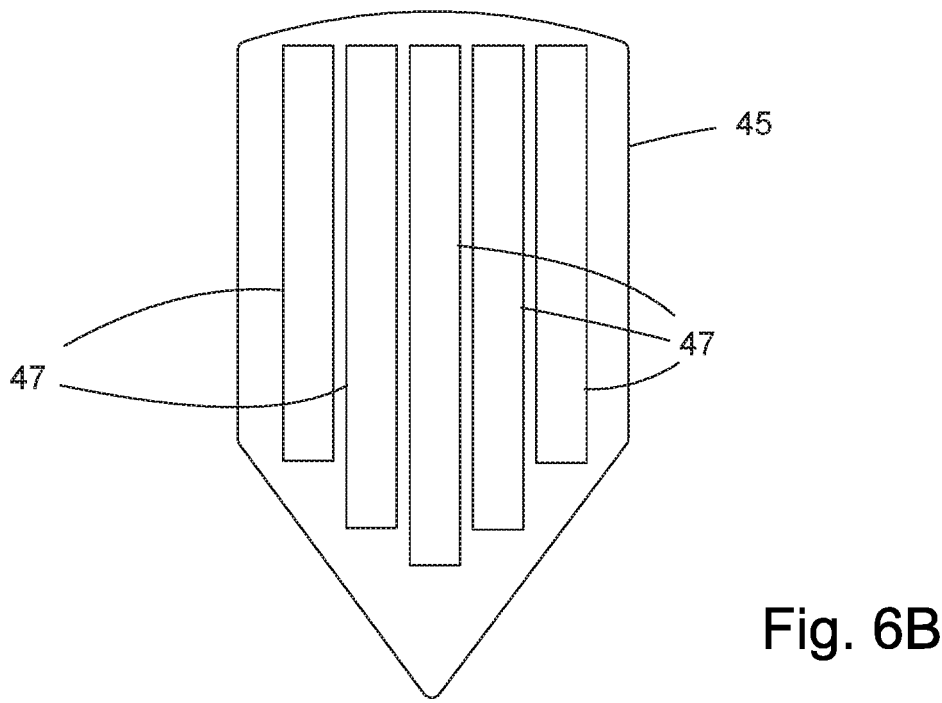
FIGS. 6 and 6A are a top view of the inlay back support layer of the main back support of the animal back support apparatus of FIG. 1 showing the inlay layer body and a plurality of elongated pads.
Figure 6B:
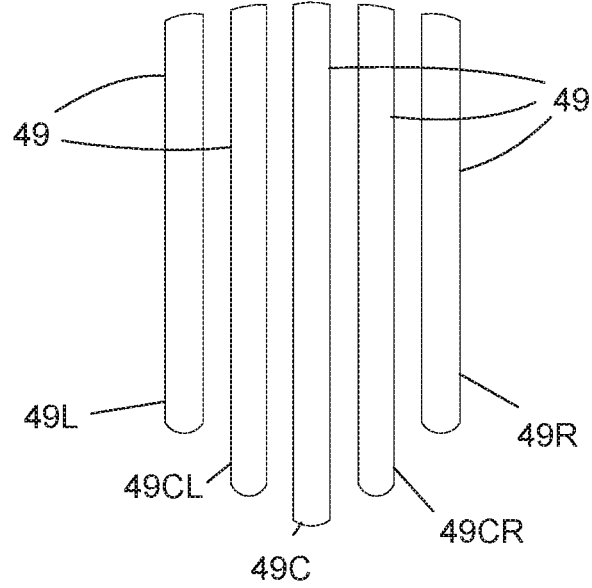

FIG. 5 shows one embodiment of main back support 30. In this embodiment, first back support layer 40 has shoulder pad portions 43 that extend from shoulder end 30a. Shoulder pad portions 43 optionally include foam padding within a material envelope to provide additional padding in the shoulder region of the four-legged animal. First back support layer 40 is a neoprene top layer piece. First back support layer 40 may be any supple and durable material such as neoprene, mesh, leather, canvas, cotton, polyester, nylon, a blend thereof, or other similar material. First back support layer 40 may overlay a bottom back support layer 50 (not shown) and/or an optional shoulder inlay 58 (not shown) that is positioned between bottom back support layer 50 and inlay back support layer 45 to provide further support padding about the shoulder of the four-legged animal. In this embodiment, bottom back support layer 50 (not shown) is made of a mesh material. Bottom back support layer 50 (not shown) may also be made of a supple and durable material and is preferably made of a breathable material such as cotton, chambray, rayon, linen, blends thereof, or other similar material. Main back support 30 further has an optional binding 46 along its periphery. In this embodiment, binding 46 is a fleece material.

First mating portion 31a of releasable connector 31 is attached to each of shoulder pad portions 43 of first back support layer 40. In this embodiment, releasable connector 31 (partially shown as first mating portion 31a of releasable connector 31) is a plastic side release buckle and first mating portion of releasable connector 31a is a female receiving portion of a plastic side release buckle. First mating portion of releasable connector 31a may be either the female receiving portion or the male portion to be received by a female receiving portion. First mating portion 31a of releasable connector 31 must complement second mating portion 31b of releasable connector 31 (not shown) for proper mating compatibility of releasable connector 31 (partially shown as first mating portion of releasable connector 31a). In the illustrated embodiment, there are six first mating portions 31a or six second mating portions 31b, or six of a mix of first and second mating portions 31a, 31b attached to first back support layer 40. Two are fixedly attached to shoulder pad portions 43 while one is fixedly attached adjacent to and spaced from first back support side 30c and another fixedly attached adjacent to and spaced from second back support side 30d. The remaining two are fixedly attached adjacent to but spaced from hip end 30b. As discussed in more detail later herein, these last two connectors 31a facilitate connection to mating connectors 31b of a lumbar support component 130 (not shown in FIGS. 1-3, shown in FIGS. 12-13C).

Support stays 42 are connected to first back support layer 40. In this embodiment, three support stays 42 are used in main back support 30. Other embodiments may use a different number of support stays 42 such as one, two, four, five, or more. Preferably, an odd number of support stays 42 are used to maintain symmetry and align at least one support stay 42 with the spine of the animal while the others are positioned symmetrically on each side of the spine.

Dimensions of support stays 42 will vary depending on variables including the size of the animal, location of support stays 42, and number of support stays 42 used. Support stays 42 may have a width of approximately 0.25 inch to approximately 2 inches. Support stays 42 may have a length of approximately 4 inches to approximately 20. In this embodiment, left support stay 42L is the same length as right support stay 42R and center support stay 42C is longer than both left support stay 42L and right support stay 42R. Preferably, support stays 42 are parallel to the spinal column of the animal.

In this embodiment, support stay 42 is disposed within a support rod cover 42b, as shown in FIG. 5, this support rod cover 42b engages with the lower first back support layer 40 to form a pocket on top of back support layer 40, and the support stay 42 is held within the support rod cover 42b. In this embodiment, support stay (or rod) 42 is an aluminum support stay with optional rubber dipped ends. Support stay 42 may be made of any rigid or semi-rigid material such as metal, wood, plastic, a combination thereof, or similar. In this embodiment, support rod cover 42b is a made from nylon. Support rod cover 42b may be made of any supple and durable material.

Main back support 30 may vary in dimensions to suit the animal. When fitted to a four-legged animal, main back support 30 will extend from a point about the shoulders, otherwise known as the top of the shoulders on the spine, to the top of the pelvis. Such measurement covers the entire thoracic spine, vertebrae T1-T13, as well as portions of the lumbar spine. This coverage allows the brace to support between approximately 50% and approximately 80% of the spine of the animal. In this embodiment, approximately 63% of the spine of the animal is supported.

FIG. 6 shows inlay back support layer 45 of main back support 30. In this embodiment, inlay back support layer 45 has pockets 47 to retain elongated pads 49. Elongated pads 49 may be sewn into pockets 47 or otherwise attached indirectly or directly to inlay back support layer 45. In this embodiment, elongated pads 49 are stationary and not removable. Other embodiments may employ a zipper or other opening mechanism to enable removability of elongated pads 49 from pockets 47 and thus enable elongated pads 49 to be removed from inlay back support layer 45. Preferably, elongated pads 49 are not removable from inlay back support layer 45.

In this embodiment, inlay back support layer 45 is constructed from neoprene. Other embodiments may use any supple and durable material. In this embodiment, five pockets 47 housing five elongated pads 49 are shown. Pockets 47 may entirely or partially cover elongated pads 49. Pockets 47 may be made of the same material as inlay back support layer 45 or a different supple, durable material. In some embodiments, pockets 47 may be carved into inlay back support layer 45 whereas others may have material sewn on to inlay back support layer 45 to make pockets 47.

Elongated pads 49 may be 4 inches to 20 inches in length, preferably 5.7 inches to 15.3 inches. The length depends on variables including the size of the animal, location of the elongated pads 49, and number of elongated pads 49 used. The length of elongated pads 49 for small animals is typically approximately 5.7 inches and the length for extra large animals is typically approximately 15.3 inches. Elongated pads 49 have a thickness in the range of approximately 0.25 inch to approximately 1 inch and the thickness is typically approximately 0.5 inch. Elongated pads 49 have a width in the range of approximately 0.5 inch wide to approximately 2 inches wide. A typically useful width is approximately 1 inch.

Elongated pads 49 may be any cushioning material made from a medium to firm density, lightweight, water repellent material that molds with body heat, has great shock absorbing qualities, and has a slow recovery time. Cushioning material such as, for example, are memory foam and/or polyethylene foam are useful as elongated pads 49. Elongated pads 49 are approximately parallel to the spinal column of the animal with at least one being aligned with the center stay 42 of first back support layer 40.

Other embodiments may vary the number of elongated pads 49 and/or pockets 47, dimensions thereof, and materials used to construct inlay back support layer 45, elongated pads 49, or pockets 47. Preferably, an odd number of elongated pads 49 are used to maintain symmetry and align at least one elongated pad 49 with center support stay 42C. More preferably, more elongated pads 49 are used than support stays 42 to provide greater flexibility while maintaining support.

In this embodiment, main back support 30 has three support stays 42 and five elongated pads 49. In this embodiment, center elongated pad 49C is aligned with center support stay 42C, leftmost elongated pad 49L is aligned with left support stay 42L, rightmost elongated pad 49R is aligned with right support stay 42R, center left elongated pad 49CL is between leftmost elongated pad 49L and center elongated pad 49C, and center right elongated pad 49CR is between center elongated pad 49C and rightmost elongated pad 49R. Other embodiments may add elongated pads 49 outside of left and right support stays 42L and 42R, eliminate center left and center right elongated pads 49CL and 49CR, or move elongated pads 49 and support stays 42 for various alignments.

Figure 7:
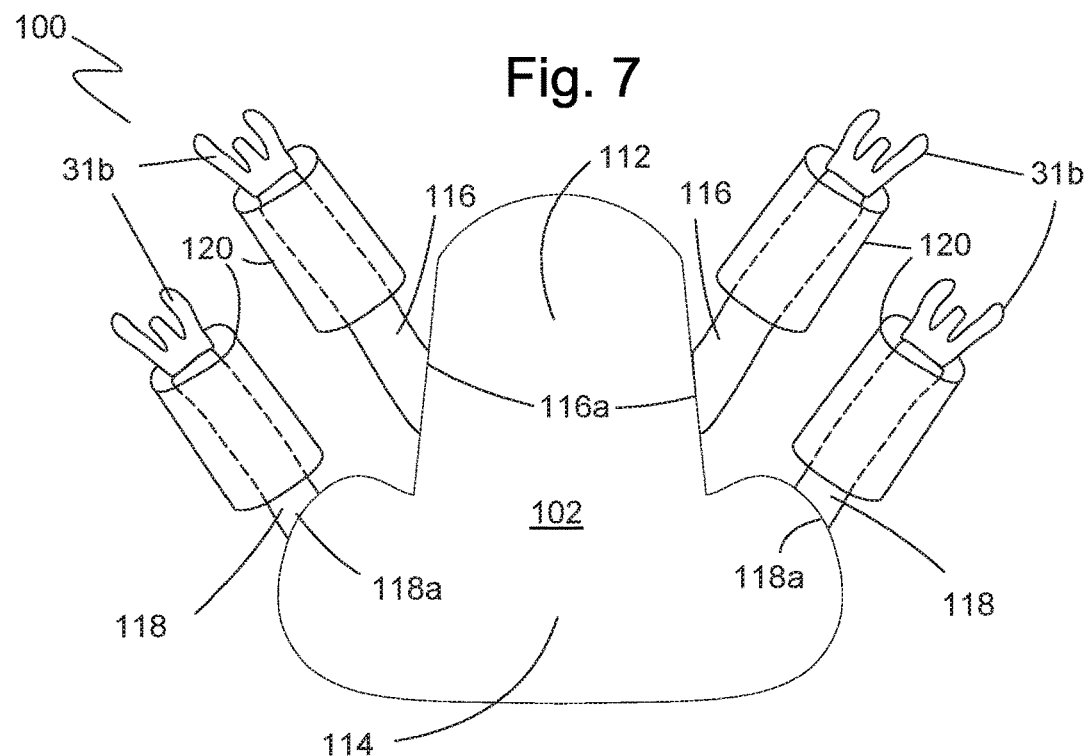
FIG. 7 is a perspective view of the chest harness of the animal back support apparatus shown in FIG. 1.

FIG. 7 shows chest harness 100. Chest harness 100 has harness body 102, a first harness body edge 104, a second harness body edge 106, a chest portion 112, an abdomen portion 114 connected to chest portion 112, a first pair of harness straps 116, and a second pair of harness straps 118. One of the first pair of harness straps 116 is attached on one end 116a to first harness body edge 104 of the chest portion 112 and the other of the first pair of harness straps 116 is attached on end 116a to the second harness body edge 106 of the chest portion 112. One of the second pair of harness straps 118 is attached on one end 118a to first harness body edge 104 of the abdomen portion 114 and the other of the second pair of harness straps 118 is attached on end 118a to the second harness body edge 106 of the abdomen portion 114 In this embodiment, chest portion 112 and abdomen portion 114 are one contiguous piece of material. Chest portion 112 and abdomen portion 114 may each be made of any supple and durable material. Chest portion 112 and abdomen portion 114 may be made of the same material or different materials.

Second mating portions 31b of releasable connector 31 are attached to opposite ends 116b of first pair of harness straps 116 and opposite ends 118b of second pairs of harness straps 118b. In this embodiment, releasable connector 31 (partially shown as first mating portion 31a of releasable connector 31) is a plastic side release buckle and second mating portion 31b of releasable connector 31 is a male portion of a plastic side release buckle. Second mating portion 31b of releasable connector 31 may be either the male portion or the female portion. Second mating portions 31b of releasable connector 31 must complement first mating portions 31a of releasable connector 31 (shown in FIG. 5) for proper mating capability of releasable connector 31.

Chest harness 100 is further shown with optional protective sleeves 120 over harness straps 116 and 118. In this embodiment, protective sleeves 120 are made of neoprene. In other embodiments, protective sleeves 120 may be made of any supple and durable material. Chest harness 100 may further include foam padding covered by a supple material with a binding 122 surrounding the circumferential edge of harness body 102. In this embodiment, binding 122 is a fleece material.

Figure 8:
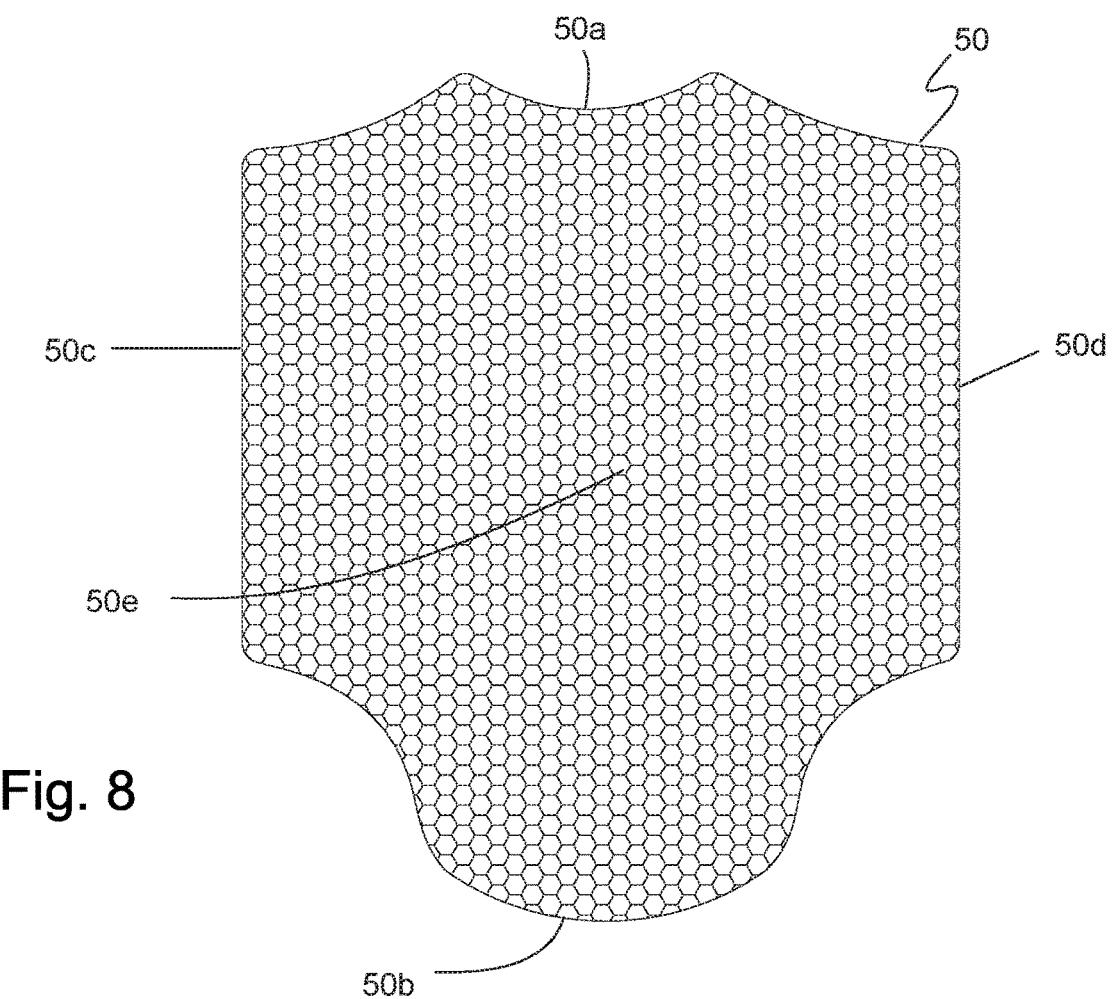
FIG. 8 is a plan view of the optional bottom back support layer of the animal back support apparatus shown in FIG. 1.

Turning now to FIG. 8, there is illustrated an optional bottom back support layer 50. Bottom back support layer 50 has the same or similar shape as main back support 30 and includes a bottom layer shoulder end 50a, a support layer hip end 50b, a first support layer side 50c, a second support layer side 50d, and a mid-body bottom layer portion 50e. Bottom back support layer 50 typically attaches to the peripheral edge of main back support 30. Bottom back support layer 50 is made of a breathable, supple, mesh material to provide a means to dissipate body heat that may become trapped between the back of the four-legged animal and the main back support 30.

Figure 9:
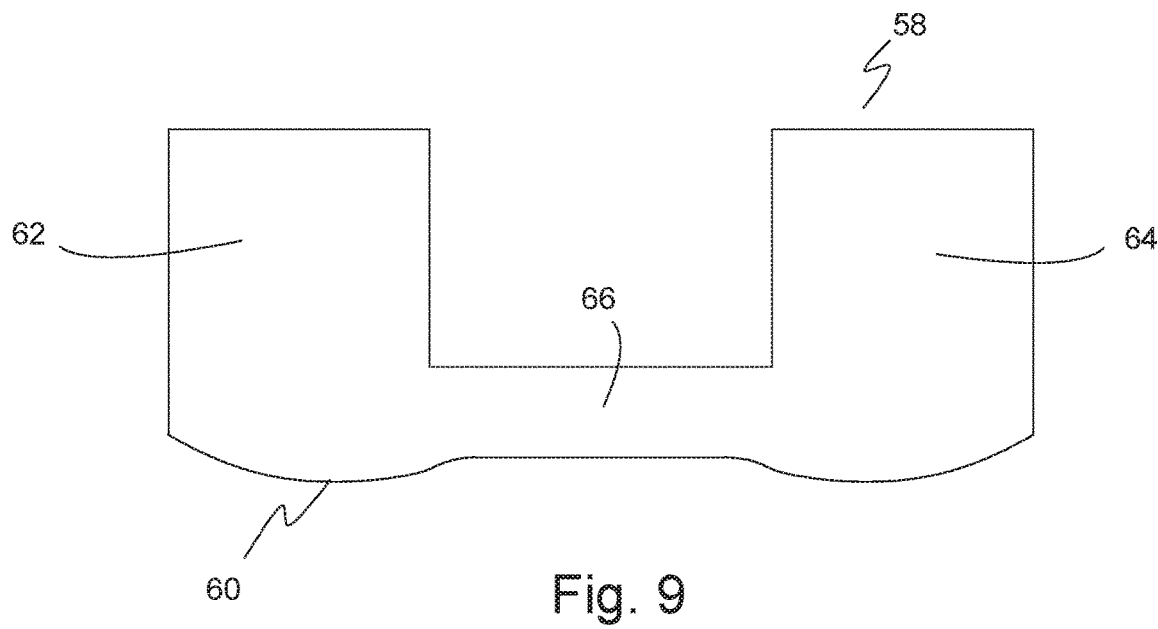
FIG. 9 is a plan view of one embodiment of an optional shoulder inlay component for use with the main back support of the present invention.

Turning now to FIG. 9, there is illustrated an optional shoulder inlay component 58. In this embodiment, shoulder inlay component 58 has a shoulder inlay body 60 with a first shoulder portion 62, a second shoulder portion 64 and a center inlay body portion 66 that connects between first shoulder portion 62 and second shoulder portion 64. In this embodiment, shoulder inlay body 60 has a U-shape where center inlay body portion 66 is attached to main back support 30 at or adjacent shoulder end 30a with a portion of each of first shoulder portion 62 and second shoulder portion 64 extending forward in front of shoulder end 30a of main back support 30. The size, shape and position of first and second shoulder portions 62, 64 is such that these shoulder portions 62, 64 provide padding between the releasable connectors 31 of harness strap 116 of chest harness 100.

Shoulder inlay 58 may be any cushioning material between approximately 0.1 inch and approximately 1 inch in thickness. Shoulder inlay 58 provides additional support and padding for the shoulder region of the animal. Shoulder inlay 58 is made of a cushioning material that has a medium to firm density, lightweight, water repellent material that molds with body heat, has great shock absorbing qualities, and has a slow recovery time. Examples of useful cushioning material are, for example, memory foam and/or polyethylene foam. Shoulder inlay 58 has a thickness approximately 0.125 inch and is typically inserted between neoprene and/or Sherpa material layers. Shoulder inlay 58 may be sewn or otherwise attached to main back support 30.

Figure 10:
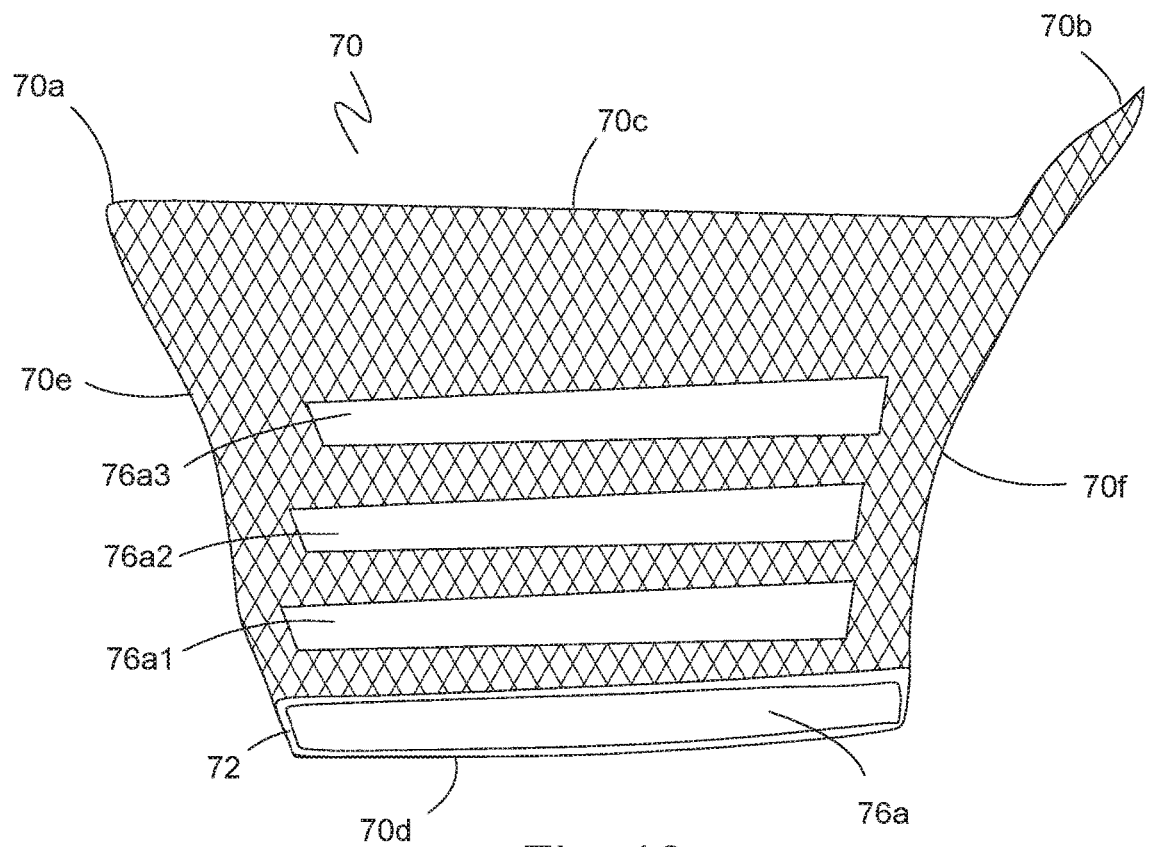
FIG. 10 is a plan view of the first side panel of the animal back support apparatus shown in FIG. 1.

FIG. 10 shows first side panel 70. First side panel 70 has a first panel shoulder end 70a, a first panel hip end 70b, a first panel top 70c, a first panel bottom 70d, a front first panel side 70e, and a rear first panel side 70f. First panel top 70c is connected to first back support side 30c of main back support 30. Typically, first panel top 70c is connected to first back support side 30c by sewing but may also incorporate various releasable connections such as a hook and loop fastener, snaps, buttons, zippers, and the like. First side panel 70 has a first panel base 72 connected to first panel bottom 70d. First panel base 72 may be made from any supple and durable material. In this embodiment, first panel base 72 is made from neoprene. First side panel 70 may be made from any supple and breathable material. In this embodiment, first side panel 70 is made from a mesh material.

First side panel 70 also includes a first side panel strip 84 that extends from first panel top 70c adjacent first panel hip end 70b and spaced from rear first panel side 70f to first panel bottom 70d. Disposed on first panel base 72 is a first fastener portion 76a of a fastener strip system 76. First fastener portion 76a extends across a major portion of first panel base 72 parallel and adjacent to first panel bottom 70d. First side panel 70 also includes additional and optional first fastener portions 76a of fastener strip system 76. In the illustrated embodiment, there are three additional first fastener portions 76a1, 76a2, 76a3. Fastener strip system 76 may be a plurality of snaps, buttons, zippers, and the like, or strips of a first hook and loop portion of a hook and loop fastener. For easy of use, hook and loop fasteners are illustrated. By including the additional optional first fastener portions 76a, it allows a user to adjust the fit of the animal back support apparatus 10 to the four-legged animal depending on the girth of the animal. The additional and optional first fastener portions 76a1, 76a2, 76a3 are positioned parallel to and spaced from first panel bottom 70a and from each other. In this embodiment, first side panel 70 has four strips of fastener strip system 76, which are hook and loop tape to enable adjustability of the animal back support apparatus 10.

Figure 11:
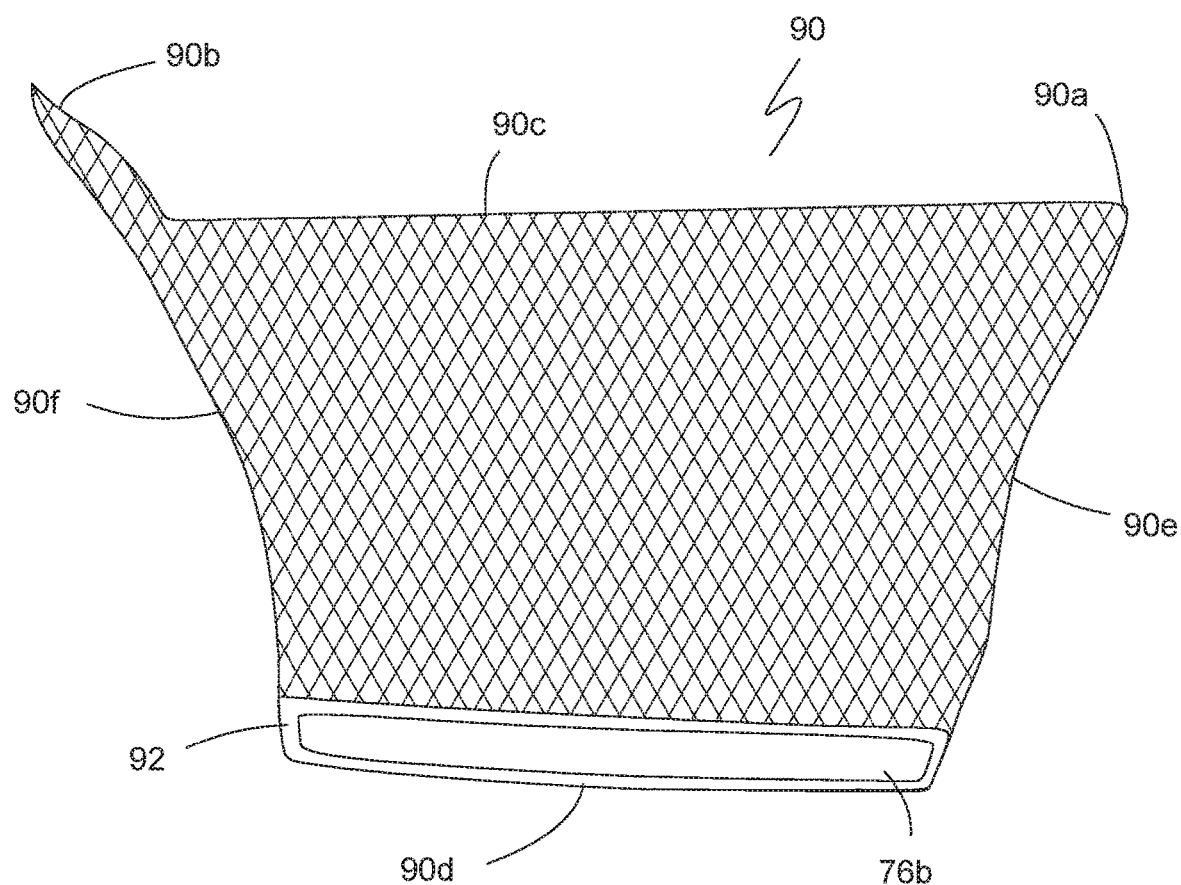
FIG. 11 is a plan view of the second side panel of the animal back support apparatus shown in FIG. 2.

FIG. 11 shows a second side panel 90. Second side panel 90 has a second panel shoulder end 90a, a second panel hip end 90b, a second panel top 90c, a second panel bottom 90d, a front second panel side 90e, and a rear second panel side 90f. Second panel top 90c is connected to second back support side 30d of main back support 30. Typically, second panel top 90c is connected to second back support side 30d by sewing but may also incorporate various releasable connections such as a hook and loop fastener, snaps, buttons, zippers, and the like. Second side panel 90 has a second panel base 92 connected to second panel bottom 90d. Second panel base 92 may be any supple and durable material. In this embodiment, second panel base 92 is made from neoprene. Second side panel 90 may be made from any supple and breathable material. In this embodiment, second side panel 90 is made from a mesh material.

Disposed on second panel base 92 is a second fastener portion 76b of fastener strip system 76. Second fastener portion 76b extends across a major portion of second panel base 92 parallel and adjacent to second panel bottom 90d. When fastener strip system 76 is hook and loop fastener, second fastener portion 76b is disposed on an underside of second side panel 90 and is complementary to first fastener portion 76a on first side panel 70 to allow proper mating of opposing hook and loop tape surfaces.

Figure 12:
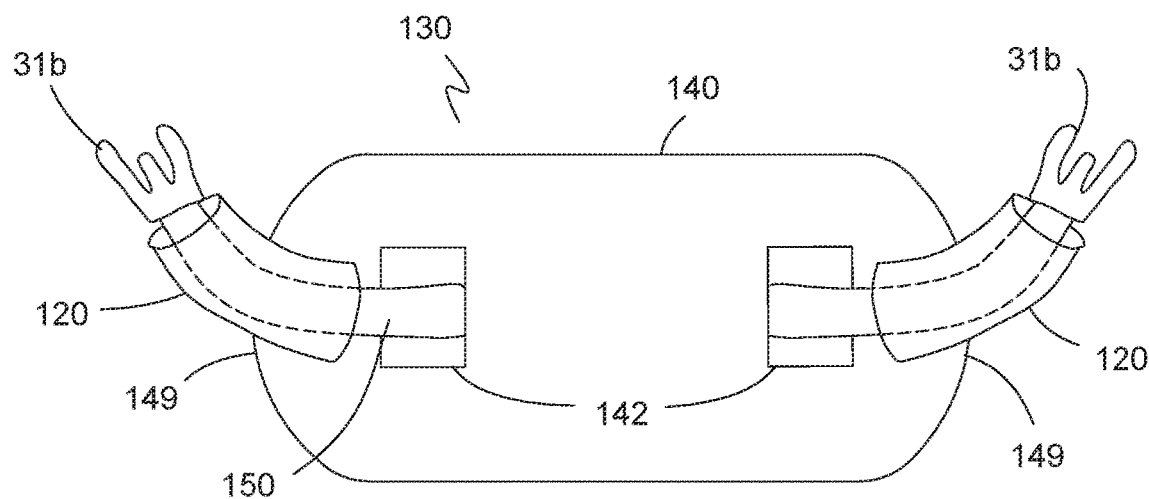
FIG. 12 is a top plan view of one embodiment of a lumbar support component for use with the main back support of the present invention.

FIG. 12 shows one embodiment of a lumbar support component 130 which is connectable to but not shown in the embodiments illustrated in FIGS. 1-3. Lumbar support component 130 has a lumbar body 140 and at least one lumbar strap 150. Lumbar support component 130 is positioned against the lower abdomen of the four-legged animal. If a single strap is used, then each end of strap 150 requires one of a first or second mating portion 31a, 31b of releasable connector 31 to form a mating connection with corresponding mating portions located adjacent to and spaced from hip end 30b of main back support 30. Illustrated is second mating portion 31b. Single strap 150 may be fixedly attached to lumbar support component 130 so that each end of strap 150 attaches to a mating connector around opposite sides of main back support 30. Alternatively, lumbar support component 130 may include two adjacent and spaced apart through openings 142 through which strap 150 passes. In still another alternative, strap 150 may be at least two separate straps that are attached on one end to opposite ends 149 of lumbar support component 130. Lumbar support component 130 may optionally have at least one protective lumbar sleeve 136 fitted over at least one lumbar strap 150. It is contemplated that each portion of lumbar strap 150 that extends around opposed sides of the four-legged animal may have a protective lumbar sleeve 136. Protective lumbar sleeves 136 may be made from any supple and durable material. In this embodiment, protective lumbar sleeves 136 are made from neoprene.

Figure 13A:
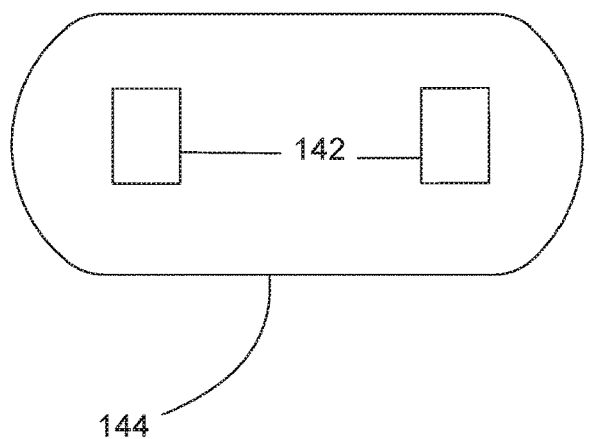
FIGS. 13A, 13B and 13C are plan views of the layers that form the lumbar support component shown in FIG. 12.
Figure 13B:
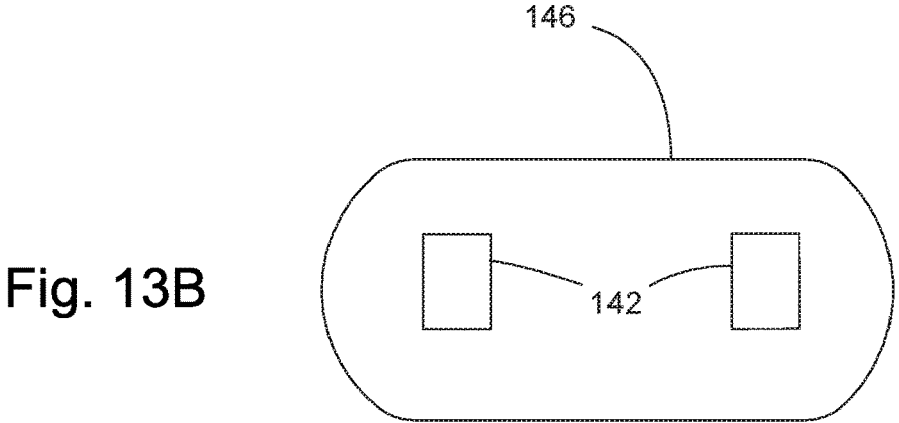
Figure 13C:
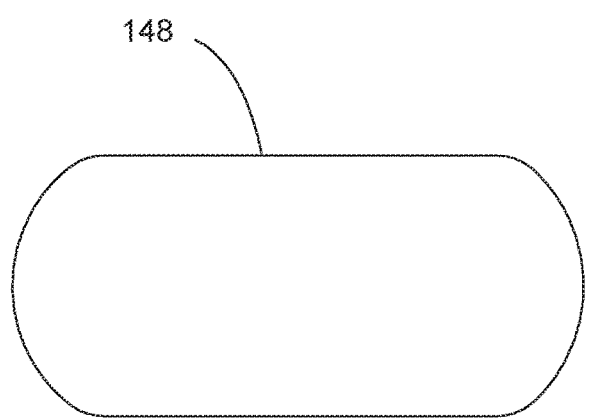
Figure 13D:
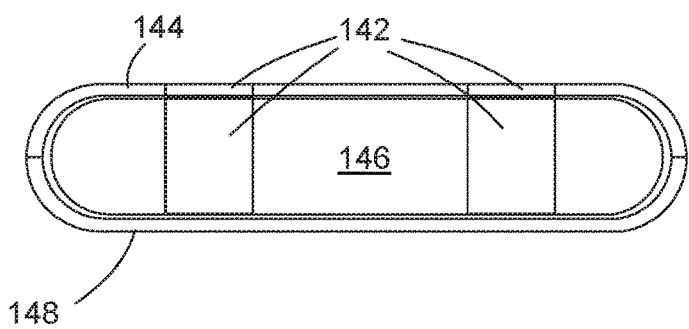
FIG. 13D is a cross-sectional view of the assembled layers that form the lumbar support component shown in FIG. 12.

Turning now to FIGS. 13A, 13B and 13C, there is illustrated one embodiment of lumbar body 140 of lumbar support component 130. In this embodiment, lumbar body 140 has a bottom lumbar layer 144, an inlay lumbar layer 146, and a top lumbar layer 148 where bottom lumbar layer 142 and top lumbar layer 148 form a chamber or sleeve for containing inlay lumbar layer 146. A lumbar binding 149 may be optionally included around the periphery of the lumbar body 140 to provide a soft cushioning edge. FIG. 13D is a cross-sectional view of the lumbar body 140, but it is not to scale in order to show the relationship of bottom lumbar layer 144, inlay lumbar layer 146 and top lumbar layer 148. As shown in this embodiment, at least one lumbar layer 144 and the inlay lumbar layer 146 has through apertures 142 to accommodate the lumbar strap (not shown). In other embodiments, there are no through apertures 142 since the lumbar strap is attached to the one of the lumbar layers 144, 148 or attached at opposite ends of the lumbar sleeve or attached along the central portion of lumbar layer 144. When attached to the lumbar layer, the method of attachment is one commonly known in the art such as, for example, by sewing, or by adhesive, and the like.

In this embodiment, bottom lumbar layer 144 may be made from any supple and durable material. One example of a useful material is neoprene. In this embodiment, inlay lumbar layer 146 is made from any cushioning material such as, for example, any cushioning material made from medium to firm density, lightweight, water repellent material that molds with body heat, has great shock absorbing qualities, and has a slow recovery time. Useful materials include, but are not limited to, memory foam and/or polyethylene foam. Inlay lumbar layer 144 may be made from. In this embodiment, lumbar binding 149 is made from fleece. In this embodiment, top lumbar layer 148 is constructed of a soft material. Protective lumbar sleeves 136 may be made from any supple and durable material. In this embodiment, protective lumbar sleeves 136 are made from neoprene.

The advantages of the animal back support 10 of the present invention is that the combination of main back support 30, chest harness 100 and optional lumbar support 140 component optimizes stabilization needed for the spine and the surrounding muscles to support the spine of the animal. Specifically, the rigid support stays and foam inlays (i.e. elongated pads) provides a back support device that limits flexion of the spine but allows the four-legged animal to run, sit, lay down, and complete all normal daily activities. The present invention is designed to move with the four-legged animal and offer support at the same time.

Figure 14:
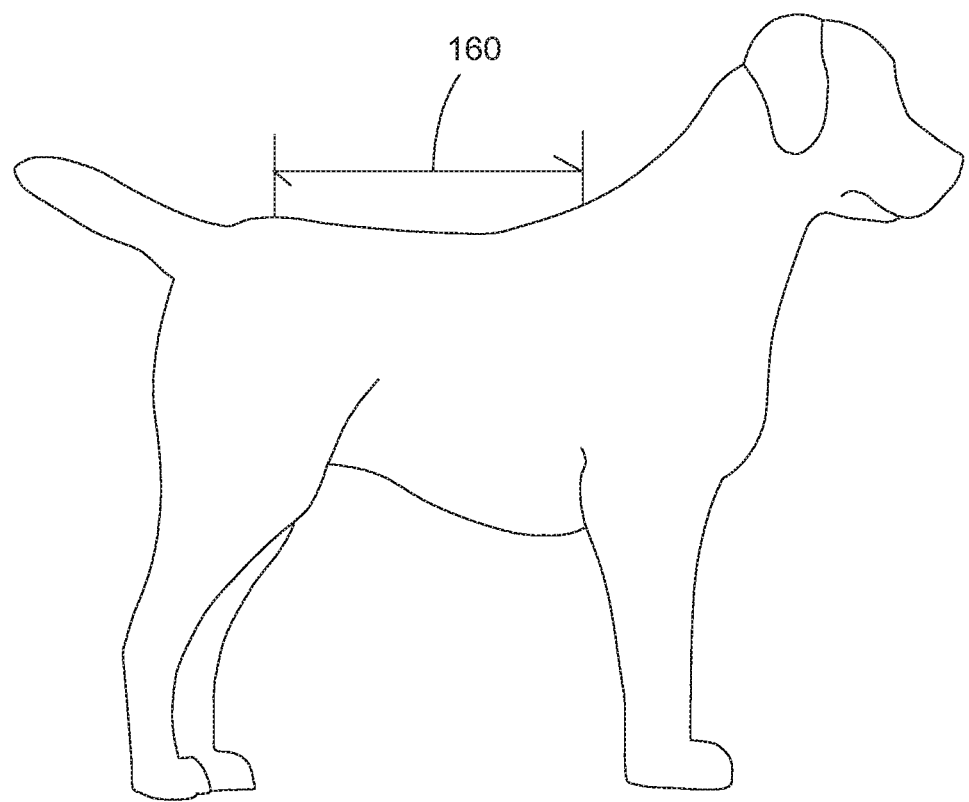
FIG. 14 is an illustration of a topline measurement showing an outline of a dog and placement of the topline measurement.

Another advantage of the present invention is the simplicity of determining the proper size of the animal back brace for a particular dog. One need only measure the distance (i.e. the topline measurement 160) between the top of the pelvis to the point of the shoulders as shown in FIG. 14. For the small size, the topline measurement is nine (9) inches to eleven (11) inches. For the medium size, the topline measurement is eleven (11) inches to thirteen (13) inches. For the large size, the topline measurement is thirteen (13) inches to fifteen (15) inches. For extra-large size, the top line measurement is fifteen (15) inches or greater.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. An animal back support apparatus comprising:
    a main back support having a shoulder end, a hip end, a first back support side, a second back support side, and a plurality of a first mating portion of a releasable connector, the main back support comprising:
        a first back support layer supporting a plurality of rigid support stays disposed within a support rod cover, and the rigid support stays positioned to extend along a spine of a four-legged animal and along both sides of the spine;
        a first pair of the plurality of the first mating portion of the releasable connector, wherein each one of the first pair is attached to a corresponding shoulder pad portion of the first back support layer and positioned adjacent to but spaced from the shoulder end;
        a second pair of the plurality of the first mating portion of the releasable connector attached to the first back support layer, wherein each of the at least the second pair is positioned adjacent to but spaced from a corresponding one of the at least the first pair of the plurality of the first mating portion of the releasable connector and located midway between the shoulder end and the hip end of the main back support;
        a bottom back support layer fixedly attached to the peripheral edge of the first back support layer; and
        an inlay back support layer fixedly attached between the bottom back support layer and the first back support layer, the inlay back support layer having a plurality of elongated inlay pads disposed thereon and adapted to extend along the spine of the four-legged animal and along both sides of the spine, the inlay back support layer configured to be positioned along a back of the four-legged animal between the back of the four-legged animal and the plurality of rigid support stays on top of the first back support layer;
        a breathable first side panel fixedly attached on a top first panel side to the first back support side; and
        a breathable second side panel fixedly attached on a top second panel side to the second back support side, wherein a bottom first panel side and a bottom second panel side are configured to removably attach to each other under an abdomen of the four-legged animal; and
    a chest harness having a harness body wherein the harness body has a chest portion, an abdomen portion, a first pair of harness straps connected on one end to the chest portion, a second pair of harness straps connected on one end to the abdomen portion, and a plurality of a second mating portion of the releasable connector;
    wherein one of the plurality of the second mating portion of the releasable connector is connected adjacent to an opposite end of each of the first pair of harness straps and connected adjacent to an opposite end of each of the second pair of harness straps;
    wherein the abdomen portion is adapted for positioning behind the front legs of the four-legged animal; and
    wherein each of the plurality of the first mating portion of the releasable connector is configured to mate with a corresponding one of the plurality of the second mating portion of the releasable connector.

2. The apparatus of claim 1 wherein the first back support layer further includes a third pair of the plurality of the first mating portion of the releasable connector attached to the first back support layer and positioned adjacent to but spaced from the hip end.

3. The apparatus of claim 2 further comprising a lumbar support component having a lumbar body with at least one lumbar strap wherein the at least one lumbar strap has one of the second mating portion of the releasable connector attached adjacent to each of a first lumbar strap end and a second lumbar strap end, wherein each of the second mating portion of the releasable connector is configured to mate with a corresponding one of the first mating portion of the releasable connector attached to the hip end of the first back support layer, wherein the lumbar support component is configured for positioning against a lower abdomen of the four-legged animal.

4. The apparatus of claim 1 wherein the chest harness includes a first harness body edge and a second harness body edge wherein one of the first pair of harness straps is connected to the first harness body edge on the chest portion and a second one of the first pair is connected to the second harness body edge on the chest portion and wherein one of the second pair of harness straps is connected to the first harness body edge of the abdomen portion and a second one of the second pair is connected to the second harness body edge on the abdomen portion.

5. The apparatus of claim 1 wherein the main support layer further includes a bottom back support layer fixedly attached to the first back support layer wherein the inlay back support layer is between the first back support layer and the bottom back support layer.

6. The apparatus of claim 1 wherein the chest harness further includes at least one protective sleeve disposed around at least one of the harness straps.

7. The apparatus of claim 1 wherein the elongated inlay pads have a thickness of 0.5 inches.

8. The apparatus of claim 1 wherein the elongated inlay pads have a length in a range from 5.7 inches to 15.3 inches.

9. The apparatus of claim 1 wherein the elongated inlay pads have a width of 1 inch.

10. The apparatus of claim 1 further comprising a shoulder inlay component positioned adjacent the inlay back support layer wherein the inlay back support layer is between the first back support layer and the shoulder inlay component, the shoulder inlay component having a shoulder inlay body, the shoulder inlay body having a first shoulder portion and a second shoulder portion wherein each of the first shoulder portion and the second shoulder portion extend forward toward and adjacent to the shoulder end of the main back support and wherein each of the first shoulder portion and the second shoulder portion are spaced from each other and located to align with a corresponding shoulder area of the foul-legged animal.

11. The apparatus of claim 10 wherein the shoulder inlay component further includes a center shoulder body portion that connects the first shoulder portion to the second shoulder portion.

12. A method of stabilizing a spine of a four-legged animal, the method comprising:
providing an animal back support having a main back support comprising a first back support layer supporting incorporating a plurality of rigid support stays disposed within a support rod cover, positioned to extend along a spine of a four-legged animal and along both sides of the spine, an inlay back support layer fixedly attached to the first back support layer, the inlay back support layer having a plurality of elongated inlay pads disposed thereon and adapted to extend along the spine of the four-legged animal and along both sides of the spine, a breathable bottom back support layer fixedly attached to the peripheral edge of the first back support layer, a breathable first side panel fixedly attached on a top first panel side to one side of the first back support layer, a breathable second side panel fixedly attached on a top second panel side to an opposite side of the first back support layer wherein a bottom first panel side and a bottom second panel side are configured to removably attach to each other under an abdomen of the four-legged animal, and a chest harness having a harness body wherein the harness body has a chest portion, an abdomen portion, a first pair of harness straps connected on one end to the chest portion, a second pair of harness straps connected on one end to the abdomen portion and a plurality of a second mating portion of the releasable connector wherein one of the plurality of the second mating portion of the releasable connector is connected adjacent to an opposite end of each of the first pair of harness straps and connected adjacent to an opposite end of each of the second pair of harness straps, wherein the abdomen portion is adapted for positioning behind the front legs of the four-legged animal;
placing the main back support onto a back of the four-legged animal wherein the shoulder end is positioned near a base of a neck of the four-legged animal and the plurality of rigid support stays are positioned to extend along a spine of the four-legged animal and along both sides of the spine;
wrapping the breathable first side panel of the main back support under an abdomen of the four-legged animal;
wrapping the breathable second side panel of the main back support under the abdomen of the four-legged animal and attaching the breathable second side panel to the breathable first side panel such that the main back support is snug around the four-legged animal;
positioning the chest harness against the chest of the four-legged animal wherein the first pair of harness straps extend across the shoulders of the four-legged animal and wherein the second mating portion of the releasable connector on the first pair of harness straps are connected to the corresponding first mating portion of the releasable connector located on the shoulder pad portion of the first back support layer, and wherein the second pair of harness straps extend from behind the front legs of the four-legged animal wherein the second mating portion of the releasable connector on the second pair of harness straps are connected to the corresponding first mating portion of the releasable connector located midway between the shoulder end and the hip end of the main back support; and
adjusting the first pair of harness straps and the second pair of harness straps whereby the chest harness fits snugly against the chest of the four-legged animal.

13. The method of claim 12 further comprising:
providing a lumbar support component having a lumbar body with at least one lumbar strap wherein the at least one lumbar strap has one of the second mating portion of the releasable connector attached adjacent to each of a first lumbar strap end and a second lumbar strap end;
positioning the lumbar support component against the lower abdomen of the four-legged animal;
connecting each of the second mating portion of the releasable connector to a corresponding one of the first mating portion of the releasable connector attached to the hip end of the first back support layer; and
adjusting the first lumbar strap end and the second lumbar strap end to thereby provide a snug fit of the lumbar support component against the lower abdomen of the four-legged animal.

14. An animal back support assembly for supporting a spine of a four-legged animal, being capable of engaging a neck, front legs, back, and lower abdomen of the four-legged animal, the animal back support assembly comprising:
a main back support, first and second side panels fixedly extending from the main back support, and a chest harness being distinct, separable, connectable, and fully releasable from the main back support via a first plurality of mating connections on the main back support which correspond to a second plurality of mating connections on the chest harness;
wherein the main back support having a plurality of overlapping layers including a first back support layer, a support rod cover layer, an inlay back support layer, a bottom back support layer, and a shoulder inlay layer;
wherein disposed within the support rod cover layer is a plurality of rigid support stays which are positioned parallel to one another, at least one of the plurality of rigid support stays positioned to extend parallel to the spine of the four-legged animal; and
wherein disposed within pockets of the inlay back support layer is a plurality of elongated inlay pads which are positioned parallel to one another, at least one of the plurality of elongated inlay pads positioned to extend parallel to the spine of the four-legged animal and under the plurality of rigid support stays.

\* \* \* \* \*